United States Patent [19]

Bujalski

[11] Patent Number: 4,668,642

[45] Date of Patent: May 26, 1987

[54] CERAMIC MATERIALS FROM SILAZANE POLYMERS

[75] Inventor: Duane R. Bujalski, Monitor Township, Bay County, Mich.

[73] Assignee: Dow Corning Corporation, Midland, Mich.

[21] Appl. No.: 837,236

[22] Filed: Mar. 7, 1986

Related U.S. Application Data

[63] Continuation of Ser. No. 653,003, Sep. 21, 1984, abandoned.

[51] Int. Cl.$^4$ .................. C04B 35/56; C04B 35/58
[52] U.S. Cl. .......................... 501/88; 501/92
[58] Field of Search .................. 501/88, 97, 92

[56] References Cited

U.S. PATENT DOCUMENTS

| | | | |
|---|---|---|---|
| 4,312,970 | 1/1982 | Gaul | 526/279 |
| 4,340,619 | 7/1982 | Gaul | 427/228 |
| 4,540,803 | 9/1985 | Cannady | 556/412 |

OTHER PUBLICATIONS

Eaborn, C., "Organosilicon Compounds," Butterworth Scientific Pub., London, 1960, p. 1.

Primary Examiner—Mark L. Bell
Attorney, Agent, or Firm—Robert L. McKellar

[57] ABSTRACT

A method is disclosed for increasing the ceramic yield of a ceramic material obtained by firing a $R_3SiNH$-containing silazane polymer to an elevated temperature in an inert atmosphere or in a vacuum. The method involves adding certain boron compounds to the $R_3SiNH$-containing silazane polymer prior to firing. Suitable boron compounds include, among others, metaboric acid, orthoboric acid, and organoboron compounds of the general formula $BR_3''$ where $R''$ is selected from the group consisting of alkyl radicals containing 1 to 5 carbon atoms, phenyl radicals, and $-OR'''$ radicals where $R'''$ is an alkyl radical containing 1 to 4 carbon atoms.

16 Claims, No Drawings

CERAMIC MATERIALS FROM SILAZANE POLYMERS

This application is a continuation of U.S. application Ser. No. 653,003, filed Sept. 21, 1984, now abandoned.

BACKGROUND OF THE INVENTION

This invention relates to the preparation of ceramic materials from silazane polymers with increased ceramic yields. The ceramic materials of this invention are obtained by firing a mixture of a $R_3SiNH$-containing silazane polymer and certain boron compounds to an elevated temperature in an inert atmosphere or in a vacuum. The boron compound additives allow for the formation of ceramic materials with increased ceramic yield.

Ceramic materials prepared from $R_3SiNH$-containing silazane polymers are known in the art. Gaul in U.S. Pat. No. 4,340,619 (issued July 20, 1982), which is hereby incorporated by reference, prepared ceramic materials by firing at elevated temperatures in an inert atmosphere a $R_3SiNH$-containing silazane polymer prepared by contacting and reacting, in an inert, essentially anhydrous atmosphere, chlorine-containing disilanes with disilazanes.

Gaul in U.S. Pat. No. 4,312,970, (issued Jan. 26, 1982), which is hereby incorporated by reference, obtained ceramics by firing a $R_3SiNH$-containing silazane polymer, prepared by contacting and reacting an organochlorosilane with a disilazane, at elevated temperatures in an inert atmosphere or in a vacuum.

Cannady in U.S. Pat. No. 4,540,803, issued on Sept. 10, 1985, which is hereby incorporated by reference, prepared ceramic materials from $R_3SiNH$-containing silazane polymers which were, in turn, prepared by contacting and reacting trichlorosilane and disilazanes.

What is newly discovered is that certain boron compounds when added to $R_3SiNH$-containing silazane polymers prior to firing at elevated temperatures, allow for the formation of ceramic materials with a significant increase in ceramic yield relative to ceramic materials fired under the same conditions without the additives.

THE INVENTION

This invention relates to a method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound.

This invention also relates to a method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound wherein said non-modified $R_3SiNH$-containing silazane polymer is prepared by contacting and reacting in an inert, essentially anhydrous atmosphere, a chlorine-containing disilane or a mixture of chlorine-containing disilanes of general formula $$(Cl_bR'_cSi)_2$$

with a disilazane of general formula $$(R_3Si)_2NH$$

at a temperature in the range of 25° C. to 300° C. while distilling by-produced volatile products, wherein R' is a vinyl group, an alkyl group of 1–3 carbon atoms, or a phenyl group; R is a hydrogen atom, a vinyl group, an alkyl group of 1–3 carbon atoms, or a phenyl group; b has a value 0.5–3; c has a value of 0–2.5; and the sum of (b+c) is equal to three.

This invention also relates to a method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound, wherein said non-modified $R_3SiNH$-containing silazane polymer is prepared by contacting and reacting in an inert, essentially anhydrous atmosphere, an organochlorosilane or a mixture of organochlorosilanes of general formula $$R'_nSiCl_{(4-n)}$$

with a disilazane of general formula $$(R_3Si)_2NH$$

at a temperature in the range of 25° C. to 300° C. while distilling by-produced volatile products, wherein R' is a vinyl group, an alkyl group of 1–3 carbon atoms, or a phenyl group; R is a hydrogen atom, a vinyl group, an alkyl group of 1–3 carbon atoms, or a phenyl group; and n has a value of 1 or 2.

This invention further relates to a method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound, wherein said non-modified $R_3SiNH$-containing silazane polymer is prepared by contacting and reacting in an inert, essentially anhydrous atmosphere, trichlorosilane with a disilazane at a temperature in the range of 25° C. to 300° C. while distilling by-produced volatile products, wherein said disilazane has the general formula $(R_3Si)_2NH$ where R is a hydrogen atom, a vinyl group, an alkyl group containing 1-3 carbon atoms, or a phenyl group.

Ceramic yield, as employed in this present specification, is the percentage yield of the ceramic product upon firing a modified or non-modified $R_3SiNH$-containing silazane polymer to an elevated temperature under an inert atmosphere or in a vacuum until the modified or non-modified $R_3SiNH$-containing silazane polymer is converted to a ceramic material. The ceramic yield is calculated by dividing the weight of the ceramic product obtained by the initial weight of the modified or non-modified $R_3SiNH$-containing silazane polymer and then multiplying the result by 100. A correction for the amount of added boron compound is not made.

The process of this invention is carried out by first mixing a $R_3SiNH$-containing silazane polymer with an effective amount of a boron compound and then firing the resulting mixture to an elevated temperature under an inert atmosphere or in a vacuum until the resulting mixture is converted to a ceramic material. By "boron compounds" we mean both the finely divided metal as well as various inorganic compounds incorporating the metal atom.

The boron compounds should be either a liquid or a solid at room temperature. By "room temperature" we mean a temperature of about 25° C.

Suitable boron compounds include metaboric acid ($HBO_2$), orthoboric acid ($H_3BO_3$), tetraboric acid ($H_2B_4O_7$), boron oxide ($B_2O_3$), boron silicide and ($B_6Si$ and $B_3Si$), tributoxyborine ($B(OC_4H_9{}^n)_3$), triethoxyborine ($B(OC_2H_5)_3$), triisopropoxyborine ($B(OC_3H_7{}^i)_3$), trimethoxyborine ($B(OCH_3)_3$), tripropoxylborine ($B(OC_3H_7{}^n)_3$), triisoamylborate ($B[OCH_2CH_2CH(CH_3)_2]_3$), dimethyl(methoxy)borine ($CH_3OB(CH_3)_2$), triethylborine ($B(C_2H_5)_3$), triisobutylborine ($B(C_4H_9{}^i)_3$), trimethylborine ($B(CH_3)_3$), tripropylborine ($B(C_3H_7{}^n)_3$), triphenylborine ($B(C_6H_5)_3$), and the like.

Suitable organoboron compounds may be described by the general formula $BR''_3$ where $R''$ is selected from the group consisting of alkyl radicals containing 1 to 5 carbon atoms, phenyl radical, and $-OR'''$ radicals where $R'''$ is an alkyl radical containing 1 to 4 carbon atoms. Preferred boron compounds include metaboric acid, orthoboric acid, and trimethoxyborine.

The method of mixing the $R_3SiNH$-containing silazane polymer and the boron compound is not critical. It is preferred that the silazane polymer and the boron compound be well mixed to help insure that the ceramic yield does not vary significantly throughout the ceramic material or article. Using an organic solvent such as toluene for the mixing medium helps to insure that the components will be well mixed. Other mixing techniques may be used.

The $R_3SiNH$-containing silazane polymer is mixed with an effective amount of a boron compound. By "an effective amount" of the boron compound I mean that amount which results in an increased ceramic yield in the resulting ceramic material. Generally the boron compound is added at such a level so as to obtain a mixture containing the $R_3SiNH$-containing silazane polymer and 0.1 to 2.0 weight percent of boron. The boron compound may be added at higher levels although no added benefits may result. It is preferred that the boron compound be present at a level equivalent to about 0.5 to 1.5 weight percent boron. The increase in ceramic yield of the ceramic material prepared by the method of this invention is determined by comparison with the ceramic yield of a ceramic material obtained by firing the same $R_3SiNH$-containing silazane polymers, without the added boron compounds, under the same experimental conditions.

The mixture of $R_3SiNH$-containing silazane polymer and an effective amount of a boron compound is fired to an elevated temperature of at least 750° C. under an inert atmosphere or in a vacuum until the mixture is converted to a ceramic material.

Although not wishing to be held to such a theory, we believe that the boron compound additives of this invention interact with the $R_3SiNH$-containing silazane during the early stages of the pyrolysis step. The interaction may be in the form of crosslinking or the promotion of crosslinking of potentially volatile species from the $R_3SiNH$-containing silazane polymer. By keeping the potential volatile material in the system more carbon, nitrogen, and silicon are available for conversion to ceramic in the latter stages of the pyrolysis step. It is expected that the boron compounds will be reduced to boron during the pyrolysis.

Silazane polymers suitable for use in the present invention are $R_3SiNH$-containing silazane polymers. $R_3SiNH$-containing silazane polymers especially useful in this invention are described in U.S. Pat. Nos. 4,312,970 and 4,340,619 and U.S. Pat. No. 4,540,803, issued on Sept. 10, 1985 all of which have been incorporated by reference.

The silazane polymers described in U.S. Pat. No. 4,312,970 are prepared by contacting and reacting in an inert, essentially anhydrous, atmosphere, an organochlorosilane or a mixture of organochlorosilanes of the general formula $R'_nSiCl_{(4-n)}$ with a disilazane having the general formula $(R_3Si)_2NH$ at a temperature in the range of 25° C. to 300° C. while distilling by-produced volatile products, wherein
R' is a vinyl group, an alkyl group of 1-3 carbon atoms, or a phenyl group;
R is a hydrogen atom, a vinyl group, an alkyl group of 1-3 carbon atoms, or a phenyl group; and n has a value of 1 or 2.

The organochloromonosilanes of U.S. Pat. No. 4,312,970 are those having the general formula $R'_nSiCl_{(4-n)}$ where R' is vinyl or an alkyl radical containing 1-3 carbon atoms or the phenyl group. Thus, those groups which are contemplated as being useful in this invention are methyl, ethyl, propyl, vinyl and phenyl. The R' groups can all be the same or they can be different. The organochloromonosilanes are common commodity chemicals and are commercially available.

The value of n is 1 or 2. Thus, single organic group substituted silanes, such as $CH_3SiCl_3$, $C_6H_5SiCl_3$, $CH_2=CHSiCl_3$, $CH_3CH_2SiCl_3$ or $CH_3(CH_2)_2SiCl_3$, double organic group substituted silanes, such as $(CH_3)_2SiCl_2$, $(C_2H_5)_2SiCl_2$ and $(CH_2=CH)(CH_3)SiCl_2$, and mixtures of such silanes, for example $CH_3SiCl_3$ and $(CH_3)_2SiCl_2$, can be used. It is preferred that when organochlorosilane mixtures are used, the number of units of diorgano-substituted silicon atoms should not exceed the number of units of monoorgano-substituted silicon atoms.

The silazane polymers of U.S. Pat. No. 4,340,619, which are the preferred silazane polymers for the practice of this invention, are prepared by contacting and reacting in an inert, essentially anhydrous, atmosphere, a chlorine-containing disilane or a mixture of chlorine-containing disilanes, of the general formula $(Cl_bR'_cSi)_2$ with a disilazane having the general formula $(R_3Si)_2NH$ at a temperature in the range of 25° C. to 300° C. while distilling by-produced volatile products, wherein R' is a vinyl group, an alkyl group of 1-3 carbon atoms, or a phenyl group;
R is a hydrogen atom, a vinyl group, an alkyl group of 1-3 carbon atoms, or a phenyl group;
b has a value of 0.5-3;
c has a value of 0-2.5; and the sum of (b+c) is equal to three.

The chlorine-containing disilanes of U.S. Pat. No. 4,340,619 are those disilanes having the general formula $(Cl_bR'_cSi)_2$ where R' is vinyl, an alkyl radical containing 1-3 carbon atoms or the phenyl group. Thus, the R' groups are methyl, ethyl, propyl, vinyl and phenyl. The R' groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1). The Direct Process is the reaction between silicon metal and aliphatic halides, generally methyl chloride, at elevated temperature in the presence of catalyst, generally copper, to produce chlorosilanes.

For the chlorine-containing disilanes described above, the value of b and c is from 0.5-3 and 0-2.5, respectively, and the sum of (b+c) is equal to three. Examples of chlorine-containing disilanes are $[Cl(CH_3)_2Si]_2$, $[Cl_2CH_3Si]_2$, $[Cl_2C_2H_5Si]_2$, $[Cl(C_6H_5)_2Si]_2$, and $[Cl_2CH_2=CHSi]_2$.

Monosilanes can also be used in admixtures with the above described chlorine-containing disilanes. Examples include $CH_3SiCl_3$, $(CH_3)_2SiCl_2$, $H(CH_3)_2SiCl$, $(CH_3)_3SiCl$, $(CH_2=CH)$ $(CH_3)_2SiCl$, $(C_2H_5)_2SiCl_2$, $C_6H_5SiCl_3$, as well as $(C_6H_5)_2SiCl_2$, and $(C_6H_5)_3SiCl$.

When polysilazane polymers are prepared in accordance with U.S. Pat. No. 4,340,619 for use in this invention it is preferred that mixtures of chlorine-containing disilanes be employed where the number of units of diorgano-substituted silicon atoms does not exceed the number of units of monoorgano-substituted silicon atoms.

The silazane polymers of U.S. Pat. No. 4,540,803 are prepared by contacting and reacting in an inert, essentially anhydrous atmosphere, trichlorosilane with a disilazane at a temperature in the range of 25° C. to 300° C. while removing by-produced volatile products, wherein said disilazane has the general formula $(R_3Si)_2NH$ where R is selected from the group consisting of vinyl, hydrogen, phenyl, and alkyl radicals containing 1 to 3 carbon atoms. It appears that some component, possibly a hydrolysis product, in aged trichlorosilane is detrimental in the preparation of this $R_3SiNH$-containing silazane polymer. Such contaminated trichlorosilane can be suitably purified by distillation. Other purification methods may also be employed. It is also preferred that the reactants be added in such a manner that the initial reaction exotherm is kept to a minimum. One reactant may be added slowly to the other reactant, or the added reactant may be cooled, or the reaction vessel may be cooled to keep the reaction exotherm low. Other methods or combination of methods may also be used. In general, it is preferred that the reaction be controlled such that the initial reaction temperature due to the exotherm is less than about 50° C., and most preferably, less than 35° C. In general, more reproducible results are obtained when purified trichlorosilane is used and when the initial reaction exotherm is controlled carefully.

The second reactant in U.S. Pat. Nos. 4,312,970 and 4,340,619 and U.S. Pat. No. 4,540,803 is a disilazane of the general formula $(R_3Si)_2NH$. R in this formula is vinyl, hydrogen, an alkyl radical of 1-3 carbon atoms or the phenyl group. Therefore, R, for purposes of this formula is represented by hydrogen, methyl, ethyl, propyl, vinyl and phenyl. Each R group in this formula can be the same or they can be different. Examples of the disilazanes include:
$[(CH_3)_3Si]_2NH$, $[C_6H_5(CH_3)_2Si]_2NH$,
$[(C_6H_5)_2CH_3Si]_2NH$, $[CH_2=CH(CH_3)_2Si]_2NH$,
$[CH_2=CH(CH_3)C_6H_5Si]_2NH$,
$[CH_2=CH(C_6H_5)_2Si]_2NH$, $[CH_2=CH(C_2H_5)_2Si]_2NH$,
$[H(CH_3)_2Si]_2NH$, and $[CH_2=CH(C_6H_5)C_2H_5Si]_2NH$.

These reactants are brought together in an inert, essentially anhydrous atmosphere. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

When the reactants are contacted with each other, as described in U.S. Pat. Nos. 4,312,970 and 4,340,619 and U.S. Pat. No. 4,540,803 the reaction begins which forms an intermediate amino compound. Upon heating, additional amino compound is formed and upon continued heating, $R_3SiCl$ is distilled from the reaction mixture and a silazane polymer is formed. The order of addition of the materials does not appear to be critical. As the temperature is raised higher, more condensation takes place and crosslinking occurs with residual $R_3Si$— that is not distilled from the mixture acting as a chain-stopper. This control allows one to stop the reaction at any point to obtain almost any desired viscosity. The desirable temperature range for this reaction is 25° C. to 300° C. A preferred temperature range for this reaction is 125°-300° C. The length of time that the reaction requires depends on the temperature employed and the viscosity one wishes to achieve.

What is meant by "volatile products" are the distillable by-produced products that are formed by the reactions set forth above. These materials can be represented by $(CH_3)_3SiCl$, $(CH_2=CH)(C_6H_5)_2SiCl$, $CH_3(C_6H_5)_2SiCl$, $(CH_3)_2C_6H_5SiCl$ and $(CH_2=CH)(CH_3)_2SiCl$. Sometimes, the process requires the use of a vacuum along with the heat in order to remove these materials from the reaction mixture.

After the $R_3SiNH$-containing silazane polymer and the boron compound are mixed, the mixture is fired to an elevated temperature of at least 750° C. until the mixture is converted to a ceramic material. It is generally preferred that the $R_3SiNH$-containing silazane polymer and boron compound mixture be vacuum stripped prior to pyrolysis. If the silazane polymer and boron compound mixture is of sufficient viscosity or if it possesses a sufficiently low melt temperature, it can be shaped first and then pyrolyzed to give a silicon nitride-containing shaped article such as a fiber. The silazane polymer and boron compound mixture can be filled with ceramic type fillers (if desired) and then fired to at least 750° C. to obtain ceramic materials or ceramic articles.

The silazane polymer and boron compound mixtures of this invention can be used in both the filled and unfilled state, depending on the application. Thus, it is contemplated within the scope of this invention to coat substrates with filled and unfilled mixtures and heat the substrates to produce ceramic coated articles. Fillers and adjuvants can be milled on 3 roll mills by simply mixing the polymers and boron compounds of this invention with the fillers and making several passes on the mill. In the alternative, the polymers and boron compounds can be placed in solvents and the fillers and adjuvants can be added thereto and after mixing the solvent can be removed to give the filled polymer mixture. The coating can be carried out by conventional means. The means used depends on the polymer mixture and substrates used and the application one has in mind. Thus, these materials can be brushed, rolled, dipped or sprayed. In the filled state, it is sometimes necessary to trowel the mixture onto the substrate. The silazane polymer and boron compound mixtures of this invention may also be used as an infiltrant with ceramic materials or as a matrix material for composites. Other uses will be apparent to those skilled in the art from a consideration of this specification.

So that those skilled in the art can better appreciate and understand the invention, the following examples are given.

In the examples, the $R_3SiNH$-containing silazane polymer and the boron compounds were mixed using the so-called wet milling method. The required amount of boron compound was added to a 50 weight percent solution of the $R_3SiNH$-containing silazane polymer in dry toluene in a half-pint mill jar. After adding ceramic milling balls, the jar was purged with argon and sealed. The sample was wet milled for 16 hours. Solvent was removed from the modified $R_3SiNH$-containing silazane by vacuum stripping for three hours at 25° C. and 3 mm Hg and for one hour at 50° C. and 2 mm Hg.

All mixed samples were stored under argon in a dry box until used.

All samples were fired in an Astro Industries Furnace 1000A water cooled graphite heated model 1000.3060-FP-12 under a helium atmosphere. All samples were fired to 1300° C. over a 5.6 hour time period, held at 1300° C. for 12 minutes, and then cooled to room temperature. During firing the firing temperature was increased to 600° C. at a rate of 2.8° C./min, then increased from 600° C. to 800° C. at a rate of 3.3° C./min, then increased from 800° C. to 1300° C. at a rate of 41.7° C./min, held at 1300° C. for 12 minutes, and then cooled at a rate of 36° C./min.

In the examples, control samples were subjected to the same treatment (i.e., the wet milling mixing procedure) as the boron compound-containing silazane polymer except that the control samples did not contain the boron compounds. The ceramic yield of control samples that were subjected to the mixing procedure and control samples that were not subjected to the mixing procedure were essentially the same when fired to elevated temperatures under the same pyrolysis conditions.

EXAMPLE 1

A $(CH_3)_3SiNH$-containing silazane polymer prepared by the procedure outlined in U.S. Pat. No. 4,340,619 was employed in this example. A mixture of methylchlorodisilanes (26 pounds), consisting of 42.5 weight percent of $Cl_2(CH_3)SiSi(CH_3)Cl_2$, 35.6 weight percent of $Cl(CH_3)_2SiSi(CH_3)Cl_2$, 9.5 weight percent $Cl(CH_3)_2SiSi(CH_3)_2Cl$, and 12.4 weight percent of low boiling chlorosilane, and hexamethyldisilazane (42.2 pounds) were reacted in a 72 liter stainless steel reactor under a nitrogen atmosphere. The reaction temperature was raised to 195° C. at a rate of 1° C./min while volatile by-products were removed by distillation. The resulting solid $(CH_3)_3SiNH$-containing silazane polymer had a softening temperature of 68° C.

A modified $(CH_3)_3SiNH$-containing silazane polymer which contained 1 weight percent boron was prepared by the wet milling technique by mixing 0.57 g orthoboric acid with 9.9 g of the $(CH_3)_3SiNH$-containing silazane polymer in toluene. Several other samples containing 1 weight percent boron from orthoboric acid were also prepared. Another sample was prepared containing 2 weight percent boron where the added boron compound was also orthoboric acid. The samples were fired under a helium atmosphere at 1300° C. (total firing time was 5.6 hours; samples were held at 1300° C. for 12 minutes). The results are presented in Table I.

TABLE I

| Addition | Boron, % | Ceramic Yield, % | Increase in Ceramic Yield, % Relative to Control |
|---|---|---|---|
| None (Control) | — | 54.3 | — |
| $H_3BO_3$ | 1.0 | 59.2 | 9.0 |
| $H_3BO_3$ | 1.0 | 60.3 | 11.0 |
| $H_3BO_3$ | 1.0 | 64.1 | 18.0 |
| $H_3BO_3$ | 1.0 | 59.9 | 10.3 |
| $H_3BO_3$ | 2.0 | 61.4 | 13.8 |

EXAMPLE 2

Using the same $(CH_3)_3SiNH$-containing silazane polymer of Example 1, a modified $(CH_3)_3SiNH$ containing silazane polymer which contained 1 weight percent boron was prepared. The boron compound used was trimethoxyborine. Samples were fired to 1300° C. under a helium atmosphere. The results are presented in Table II.

TABLE II

| Additive | Boron, % | Ceramic Yield, % | Increase in Ceramic Yield, % Relative to Control |
|---|---|---|---|
| None (Control) | — | 54.0 | — |
| B(OCH$_3$)$_3$ | 1.0 | 57.2 | 5.9 |

EXAMPLE 3

This example is for comparison purposes only. A 1.0 weight percent boron-containing (CH$_3$)$_3$SiNH-containing silazane polymer was prepared by mixing the silazane polymer of Example 1 and sodium borate (Na$_2$B$_4$O$_7$). The sample was fired to 1300° C. as before. The modified silazane polymer had a ceramic yield of 52.2 percent as compared to 54.0 percent for the control. This example illustrates that not all combinations of boron compounds, R$_3$SiNH-containing silazane polymers, and firing conditions will lead to a ceramic product with an increased ceramic yield.

EXAMPLE 4

This example is included for comparison purposes only. Using the silazane polymer of Example 1, a series of additives were examined to determine their effect on the ceramic yield. The additives were presented at levels corresponding to about 1.0 weight percent of the element. None of the additives significantly increased ceramic yield. The additives are given in Table III.

TABLE III

| Element | Additives Which Did Not Enhance Ceramic Yield – Additive |
|---|---|
| Al | Aluminum sec-butoxide |
|  | Aluminum oxide |
|  | Aluminum acetylacetonate |
| Ba | Barium octoate |
| C | Carbon black |
| Ce | Cerium (III) octoate |
| Cr | Chromium metal |
| Co | Cobalt (II) octoate |
| Cu | Copper (II) octoate |
| Hf | Bis(cyclopentadienyl)hafnium dichloride |
| Fe | Iron (III) oxide |
|  | Iron (III) octoate |
|  | Iron (II) acetylacetonate |
|  | Nonacarbonyldiiron |
|  | Iron (III) chloride |
| Pb | Lead (II) octoate |
| Mg | Ethyl magnesium bromide |
| Mn | Manganese (II) octoate |
|  | Manganese (IV) octoate |
| Hg | Mercury (II) acetate |
| Mo | Molybdenum (VI) octoate |
| Ni | Nickel metal |
|  | Nickel (II) octoate |
| Os | Ammonia hexabromoosmate |
| P | Phosphoric acid |
| Rh | Rhodium chloride |
| Sr | Strontium acetylacetonate |
| S | Elemental sulfur |
| Sn | Tin metal |
|  | Tin (II) laurate |
| Ti | Titanium dioxide |
| W | Mesitylene tricarbonyl tungstate |
| V | Vanadium metal |
|  | Vanadium (III) acetylacetonate |
| Y | Yittrium acetylacetonate |
| Zn | Zinc metal |
|  | Zinc (II) octoate |
| Zr | Zirconium octoate |
| Fe/Ni | Iron (III) octoate and Nickel (II) octoate |
| Fe/Cu | Iron (III) octoate and Copper (II) octoate |
| Co/Cu | Cobalt (II) octoate and Copper (II) octoate |
| Ti/C | Titanium dioxide and Carbon black |

That which is claimed is

1. A method of preparing a ceramic material with increased ceramic yield, said method comprising heating a modified R$_3$SiNH-containing silazane polymer in an inert atmosphere or in a vacuum to a temperature of at least 750° C. until said modified R$_3$SiNH-containing silazane polymer is converted to a ceramic material with increased ceramic yield relative to a non-modified R$_3$SiNH-containing silazane polymer heated under the same conditions, wherein said modified R$_3$SiNH-containing silazane polymer is prepared by mixing the non-modified R$_3$SiNH-containing silazane polymer with an effective, ceramic yield increasing, amount of a boron compound, wherein R is independently selected from the group consisting of hydrogen atoms, vinyl group, an alkyl group of 1 to 3 carbon atoms and the phenyl group and wherein, the boron compounds are selected from the group of compounds consisting of metaboric acid, orthoboric acid, tetraboric acid, boron oxide and boron silicide.

2. A method of preparing a ceramic material with increased ceramic yield, said method comprising heating a modified R$_3$SiNH-containing silazane polymer in an inert atmosphere or in a vacuum to a temperature of at least 750° C. until said modified R$_3$SiNH-containing silazane polymer is converted to a ceramic material with increased ceramic yield relative to a non-modified R$_3$SiNH-containing silazane polymer heated under the same conditions, wherein said modified R$_3$SiNH-containing silazane polymer is prepared by mixing the non-modified R$_3$SiNH-containing silazane polymer with an effective, ceramic yield increasing, amount of a boron compound, wherein said non-modified R$_3$SiNH-containing silazane polymer is prepared by contacting and reacting in an inert, essentially anhydrous atmosphere, a chlorine-containing disilane or a mixture of chlorine-containing disilanes of general formula $$(Cl_bR'_cSi)_2$$

with a disilazane of general formula $$(R_3Si)_2NH$$

at a temperature in the range of 25° C. to 300° C. while distilling by-produced volatile products, wherein R' is a vinyl group, an alkyl group of 1–3 carbon atoms, or a phenyl group; R is a hydrogen atom, a vinyl group, an alkyl group of 1–3 carbon atoms, or a phenyl group; b has a value of 0.5–3; c has a value of 0–2.5; and the sum of (b+c) is equal to three and wherein the boron compounds are selected from the group of compounds consisting of metaboric acid, orthoboric acid, tetraboric acid, boron oxide and boron silicide.

3. A method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound, wherein the non-modified $R_3SiNH$-containing silazane polymer is prepared by contacting and reacting in an inert, essentially anhydrous atmosphere, an organochlorosilane or a mixture of organochlorosilanes of general formula $$R'_nSiCl_{(4-n)}$$

with a disilazane of general formula $$(R_3Si)_2NH$$

at a temperature in the range of 25° C. to 300° C. while distilling by-produced volatile products, wherein R' is a vinyl group, an alkyl group of 1-3 carbon atoms, or a phenyl group; R is a hydrogen atom, a vinyl group, an alkyl group of 1-3 carbon atoms, or a phenyl group; and n has a value of 1 or 2 wherein the boron compounds are selected from the group of compounds consisting of metaboric acid, orthoboric acid, tetraboric acid, boron oxide and boron silicide.

4. A method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound, wherein the non-modified $R_3SiNH$-containing silazane polymer is prepared by contacting and reacting in an inert, essentially anhydrous atmosphere, trichlorosilane with a disilazane at a temperature in the range of 25° C. to 300° C. while distilling by-produced volatile products, wherein said disilazane has the general formula $$(R_3Si)_2NH$$

where R is a hydrogen atom, a vinyl group, an alkyl group containing 1-3 carbon atoms, or a phenyl group wherein the boron compounds are selected from the group of compounds consisting of metaboric acid, orthoboric acid, tetraboric acid, boron oxide and boron silicide.

5. A method as defined in claim 1 wherein said boron compound is a metaboric acid or orthoboric acid.

6. A method as defined in claim 2 wherein said boron compound is a metaboric acid or orthoboric acid.

7. A method as defined in claim 3 wherein said boron compound is a metaboric acid or orthoboric acid.

8. A method as defined in claim 4 wherein said boron compound is a metaboric acid or orthoboric acid.

9. A method of preparing a ceramic material with increased ceramic yield, said method comprising heating a modified $R_3SiNH$-containing silazane polymer in an inert atmosphere or in a vacuum to a temperature of at least 750 degrees C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound, where R is independently selected from the group consisting of hydrogen atoms, vinyl group, an alkyl group of 1 to 3 carbon atoms and the phenyl group and wherein, the boron compounds are selected from compounds of the general formula $BR''_3$ wherein R" is independently selected from the group consisting of alkyl radicals containing 1 to 5 carbon atoms, phenyl radicals, and OR" radicals wherein R" is an alkyl radical containing 1 to 4 carbon atoms.

10. A method of preparing a ceramic material with increased ceramic yield, said method comprising heating a modified $R_3SiNH$-containing silazane polymer in an inert atmosphere or in a vacuum to a temperature of at least 750 degrees C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound, wherein said non-modified $R_3SiNH$-containing silazane polymer is prepared by contacting and reacting in an inert, essentially anhydrous atmosphere, a chlorine-containing disilane or a mixture of chlorine-containing disilanes of the general formula $$(Cl_bR'_cSi)_2$$

with a disilazane of the general formula $$(R_3Si)_2NH$$

at a temperature in the range of 25 degrees C. to 300 degrees C. while distilling by-produced volatile products, wherein R' is a vinyl group, an alkyl group of 1 to 3 carbon atoms, or a phenyl group; R is a hydrogen atom, a vinyl group, an alkyl group of 1 to 3 carbon atoms, or a phenyl group; b has a value of 0.5 to 3; c has a value of 0 to 2.5; and the sum of (b+c) is equal to three and wherein the boron compounds are selected from compounds of the general formula $BR''_3$ wherein R" is independently selected from the group consisting of alkyl radicals containing 1 to 5 carbon atoms, phenyl radicals, and OR" radicals wherein R" is an alkyl radical containing 1 to 4 carbon atoms.

11. A method of preparing a ceramic material with increasing ceramic yield, said method comprising heating a modified $R_3SiNH$-containing silazane polymer in an inert atmosphere or in a vacuum to a temperature of at least 750 degrees C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound, wherein the non-modified $R_3SiNH$-containing silazane polymer is prepared by contacting and reacting in an inert, essentially anhydrous atmosphere, an organochlorosilane or a mixture of organochlorosilanes of the general formula $$R'_nSiCl_{(4-n)}$$

with a disilazane of the general formula $$(R_3Si)_2NH$$

at a temperature in the range of 25 degrees to 300 degrees C. while distilling by-produced volatile products, wherein R' is a vinyl group, an alkyl group of 1 to 3 carbon atoms, or a phenyl group; R is a hydrogen atom, a vinyl group, an alkyl group of 1 to 3 carbon atoms, or a phenyl group; and n has a value of 1 or 2 wherein and boron compounds are selected from compounds of the general formula $BR''_3$ wherein R'' is independently selected from the group consisting of alkyl radicals containing 1 to 5 carbon atoms, phenyl radicals, and OR'' radicals wherein R'' is an alkyl radical containing 1 to 4 carbon atoms.

12. A method of preparing a ceramic material with increased ceramic yield, said method comprising heating a modified $R_3SiNH$-containing silazane polymer in an inert atmosphere or in a vacuum to a temperature of at least 750 degrees C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a boron compound, wherein the non-modified $R_3SiNH$-containing silazane polymer is prepared by contacting and reacting in an inert, essentially anhydrous atmosphere, trichlorosilane with a disilazane at a temperature in the range of 25 degrees C. to 300 degrees C. while distlling by-produced volatile products, wherein said disilazane has the general formula $$(R_3Si)_2NH$$

wherein R is a hydrogen atom, a vinyl group, an alkyl group containing 1 to 3 carbon atoms, or a phenyl group wherein the boron compounds are selected from compounds of the general formula $BR''_3$ wherein R'' is independently selected from the group consisting of alkyl radicals containing 1 to 5 carbon atoms, phenyl radicals, and OR'' radicals wherein R'' is an alkyl radical containing 1 to 4 carbon atoms.

13. A method as defined in claim 9 wherein said boron compound is $B(OCH_3)_3$.

14. A method as defined in claim 10 wherein said boron compound is $B(OCH_3)_3$.

15. A method as defined in claim 11 wherein said boron compound is $B(OCH_3)_3$.

16. A method as defined in claim 12 wherein said boron compound is $B(OCH_3)_3$.

* * * * *